(12) United States Patent
Williams et al.

(10) Patent No.: US 10,906,480 B2
(45) Date of Patent: Feb. 2, 2021

(54) MAGNETIC WEATHER STRIP SEAL

(71) Applicant: Toyota Motor Engineering & Manufacturing North America, Inc., Plano, TX (US)

(72) Inventors: Paxton S. Williams, Milan, MI (US); Brandon H. Hanna, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 70 days.

(21) Appl. No.: 16/115,691

(22) Filed: Aug. 29, 2018

(65) Prior Publication Data
US 2020/0070743 A1 Mar. 5, 2020

(51) Int. Cl.
*F16J 15/02* (2006.01)
*B60R 13/06* (2006.01)
*F16B 1/00* (2006.01)

(52) U.S. Cl.
CPC ............... *B60R 13/06* (2013.01); *F16B 1/00* (2013.01); *F16J 15/022* (2013.01); *F16B 2001/0035* (2013.01)

(58) Field of Classification Search
CPC .... B60R 13/06; F16B 1/00; F16B 2001/0035; F16J 15/022; F16J 15/02; F16J 15/027; B60J 10/00
USPC ................................................ 277/629, 921
See application file for complete search history.

(56) References Cited

U.S. PATENT DOCUMENTS

| | | | | | |
|---|---|---|---|---|---|
| 2,446,336 | A | * | 8/1948 | Mark | E05C 19/161 49/395 |
| 2,659,116 | A | * | 11/1953 | Korb | E05C 19/161 49/478.1 |
| 5,257,791 | A | * | 11/1993 | Cittadini | B60J 10/24 277/629 |
| 5,355,628 | A | * | 10/1994 | Dranchak | B60J 10/38 49/483.1 |
| 6,487,819 | B1 | * | 12/2002 | Goldberg | B60J 10/24 49/475.1 |
| 6,655,698 | B2 | * | 12/2003 | Nozaki | F16J 15/027 277/629 |
| 6,848,217 | B2 | * | 2/2005 | Hashimoto | B60J 10/24 49/490.1 |
| 6,877,279 | B2 | * | 4/2005 | Russell | B60J 10/24 49/498.1 |

(Continued)

*Primary Examiner* — Nathan Cumar
(74) *Attorney, Agent, or Firm* — Christopher G. Darrow; Darrow Mustafa PC (57) ABSTRACT

A weather strip seal system is provided for sealing a variable width gap between two components of a vehicle. The seal includes a main body portion defining a length dimension and a width dimension, with at least a portion of the main body portion being expandable and retractable in the width dimension. A connection end is provided, defined by a first longitudinally extending edge of the main body portion, and is configured for permanently connecting the weather strip seal to a first vehicle component. A coupling end is provided, opposite the connection end, defined by a second longitudinally extending edge of the main body portion, and is configured for removably coupling the weather strip seal to a second first vehicle component. A magnetic sealing mechanism is provided to removably couple the weather strip seal to the second vehicle component.

11 Claims, 7 Drawing Sheets

(56) References Cited

U.S. PATENT DOCUMENTS

2003/0121211 A1\* 7/2003 Hashimoto ............. B60J 10/00
49/490.1

\* cited by examiner

MAGNETIC WEATHER STRIP SEAL

TECHNICAL FIELD

The present disclosure generally relates to weather strip seals and, more particularly, to a magnetic retention feature for a weather strip seal disposed in a variable width gap between components of a vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

The use of weather strip seals is common between different areas of a vehicle in order to prevent or minimize moisture/debris from entering and potentially damaging certain spaces due to corrosion, or the like. For example, vehicle door frames may be provided with weather strip seals around at least a portion of their perimeter to keep air, water, and noise out of the passenger cabin. Weather strip seals may also be used on certain exterior regions of vehicles to reduce air from passing between certain components. For example, weather strip seals can affect the laminar flow of air down the side of a vehicle, which may increase aerodynamic drag on the vehicle and reduce fuel economy. One such exemplary exterior seal may be provided in the small space between a passenger cabin and a cargo bed of a pick-up truck or utility vehicle.

Various attachment means have been used to secure weather strip seals, including clips, fasteners, tape, and the like. While they may be selected based on cost or the ease of assembly, frictional contact between the seal (i.e., the lip portion) and the various neighboring components of the vehicle may cause damage. For example, with respect to the weather strip seal placed between the passenger cabin and the cargo bed, there may be instances when either one or both of the passenger cabin and cargo bed shift or move independent from one another. The friction that results from the repeated shifting movement between the weather strip seal and the paint can ultimately lead to corrosion issues. While one alternative can be to place anti-chip tape on the painted surface adjacent a lip of the weather strip seal, this requires additional labor and material costs. Another alternative would be to provide a small gap between the lip of the weather strip seal and the respective cabin/bed component, however, this would at least partially negate the purpose of the seal with respect to aerodynamic drag. Still further, the gap(s) between vehicle components may be relatively small. For example, certain gaps may not even provide enough space for a worker to use their hand, or even a tool, to align or realign a seal member during an assembly process.

Accordingly, it would be desirable to provide an improved weather strip seal that can aggressively serve its intended purpose without affecting the paint or finish of adjacent components.

SUMMARY

This section provides a general summary of the disclosure, and is not a comprehensive disclosure of its full scope or all of its features.

In various aspects, the present teachings provide a weather strip seal for sealing a gap between two components of a vehicle. The weather strip seal includes a main body portion defining a length dimension and a width dimension. At least a portion of the main body portion may be expandable and retractable in the width dimension. A connection end is provided, defined by a first longitudinally extending edge of the main body portion, and is configured for connecting the weather strip seal to a first vehicle component. A coupling end is provided, opposite the connection end, defined by a second longitudinally extending edge of the main body portion, and is configured for removably coupling the weather strip seal to a second first vehicle component. A magnetic sealing mechanism is provided to removably couple the weather strip seal to the second vehicle component. In various aspects, the coupling end may include at least one magnet configured to couple with a magnetic material located at the second vehicle component. In other aspects, the coupling end may include a magnetic material configured to couple with a magnet located at the second vehicle component.

In other aspects, the present teachings provide a weather strip seal system for sealing a variable width gap between two components of a vehicle. The weather strip seal includes a main body portion defining a length dimension and a width dimension. At least a portion of the main body portion is expandable and retractable in the width dimension. The main body portion includes a connection end defined by a first longitudinally extending edge of the main body portion and is configured for connecting the weather strip seal to a first vehicle component. A coupling end is provided, opposite the connection end, defined by a second longitudinally extending edge of the main body portion. The coupling end is configured for removably coupling the weather strip seal to a second vehicle component. The first vehicle component is separated from the second vehicle component by a gap defining a gap width that is variable during operation of the vehicle. The system includes a magnet located at the coupling end of the weather strip seal and configured to removably secure itself to a magnetic metal located at a second vehicle component.

In still other aspects, the present teachings are directed to a vehicle. The vehicle can include a vehicle frame, a passenger compartment secured to the vehicle frame, and a cargo bed secured to the vehicle frame. The cargo bed may be separated from the passenger compartment by a gap defining a gap width that is variable during operation of the vehicle. A weather strip seal system is positioned in the gap between the passenger compartment and the cargo bed. The weather strip seal system may include a main body portion defining a length dimension and a width dimension. At least a portion of the main body portion may be expandable and retractable in the width dimension. A connection end may be provided defined by a first longitudinally extending edge of the main body portion, and is configured for connecting the weather strip seal to a connection area of one of the passenger cabin and the cargo bed. A coupling end may be provided, opposite the connection end, defined by a second longitudinally extending edge of the main body portion. The coupling end may be provided with a magnetic sealing mechanism configured for removably coupling the weather strip seal to a coupling area of the other of the passenger cabin and the cargo bed. In various aspects, the magnetic sealing mechanism includes a magnet encapsulated in the coupling end of the weather strip seal, configured to removably secure itself to a magnetic metal located in the coupling area. The coupling area may define at least one retention feature configured for aligning the magnet in a preferred location.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1 is a side perspective view of an exemplary truck utility vehicle having a passenger compartment and a cargo bed area with a variable width gap there between;

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides weather strip seals for gaps that may be formed at an interface between at least two vehicle components. By way of context, some vehicles, such as truck utility vehicles, are built using a body-on-frame construction, where a plurality of individual body panels or components are mounted on a rigid frame. Since the individual body panels or components may move independently from one another during operation of the vehicle, relatively large nominal gaps are provided between certain neighboring panels or components. The gaps may have a variable width, and lead to adverse aerodynamic affects during the movement of the vehicle, however. Thus, in one or more aspects, the present technology provides a weather strip seal that can be operatively placed between a first vehicle component and a second vehicle component.

The weather strip seal may be provided with a longitudinally extending main body portion configured with an expandable and retractable width dimension to cover or fill a variable width gap. A connection end is provided, defined by a first longitudinally extending edge of the main body portion, and is configured for connecting the weather strip seal to a first vehicle component. A coupling end is provided, opposite the connection end, defined by a second longitudinally extending edge of the main body portion, and is configured for removably coupling the weather strip seal to a second first vehicle component. A magnetic sealing mechanism is provided to removably couple the weather strip seal to the second vehicle component. As will be described in more detail below, the coupling end may include at least one magnet configured to couple with a magnetic material located at the second vehicle component. In other aspects, the coupling end may include a magnetic material configured to couple with a magnet located at the second vehicle component.

Figure 1:
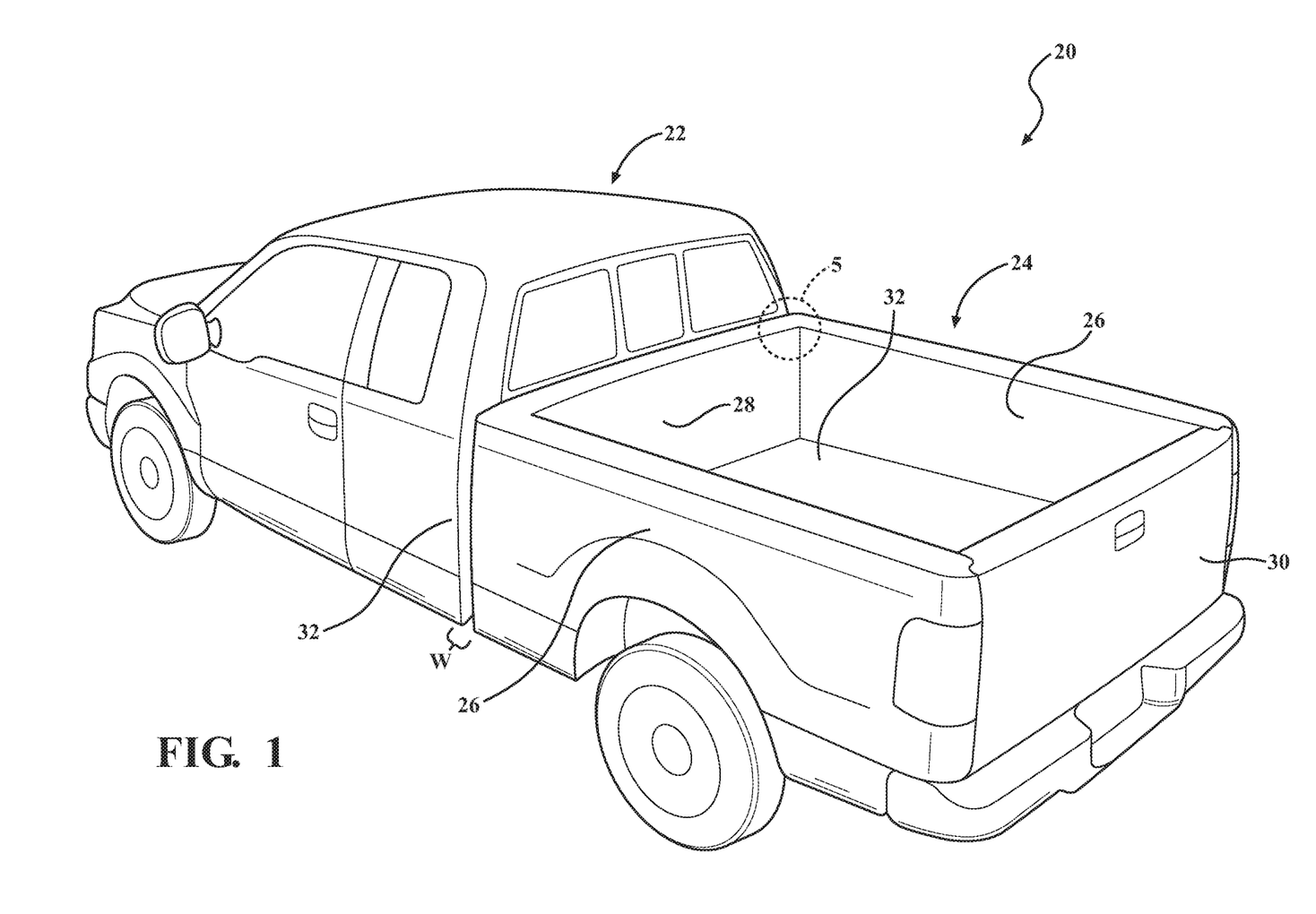

FIG. 1 is a side perspective view of an exemplary vehicle, a pickup truck 20, having a passenger compartment 22 and a cargo bed 24. While the present technology may be described and presented in the drawings with respect to a pickup truck as an exemplary utility vehicle, it should be understood that the multi-purpose accessory disclosed herein may be used with a variety of differently configured vehicles, for travel either on paved government streets/roads as well as for off-road use. Similarly in this regard, while the specific examples shown and described in this application may be directed to sealing a gap that is located between the passenger compartment 22 and cargo bed 24, the present technology may be used to seal any gap that may be present between first and second components of a vehicle. For example, the weather strip seal can be used to close a gap between a door and the passenger compartment; a trunk and a rear area of the vehicle; a hood and a front area of the vehicle; as well as a bumper and an adjacent vehicle component, and the like.

Figure 2A:
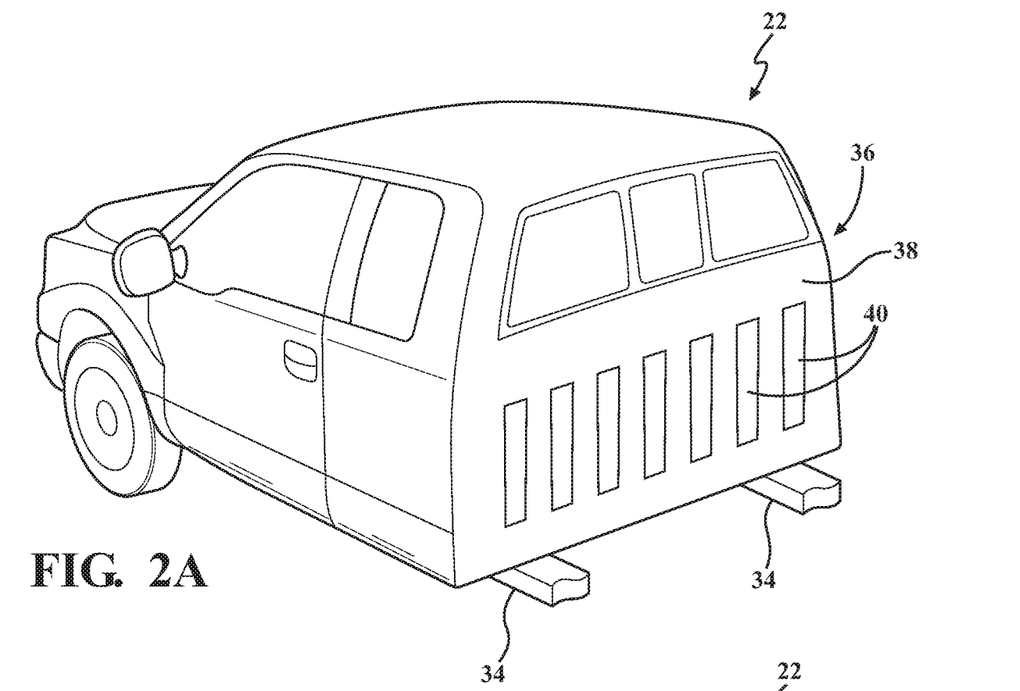
FIG. 2A is a side perspective view of the passenger compartment of the truck utility vehicle of FIG. 1.

The cargo bed 24 is generally defined by opposing side walls 26, a front wall 28, and a tailgate 30 movable between an open and closed position. The passenger compartment 22 and the cargo bed 24 may be independently coupled to a vehicle frame 34 (FIG. 2) such that there is a small gap 32 between the passenger compartment 22 and the cargo bed 24. The gap 32 has a width dimension (W), which is the distance between the passenger compartment 22 and the cargo bed 24. As mentioned above, the width may vary in dimension based on the operation of the vehicle 20 and, more particularly, based on the independent movement of each of the passenger compartment 22 and the cargo bed 24 with respect to the vehicle frame 34. The width may be uniform or may vary along a length dimension of the different vehicle components. The width may also not be of a sufficient size to allow for the use of one's hands or other tools to have sufficient access to adjust an alignment or location of a seal once installed, which is where the present technology provides additional utility.

Figure 2B:
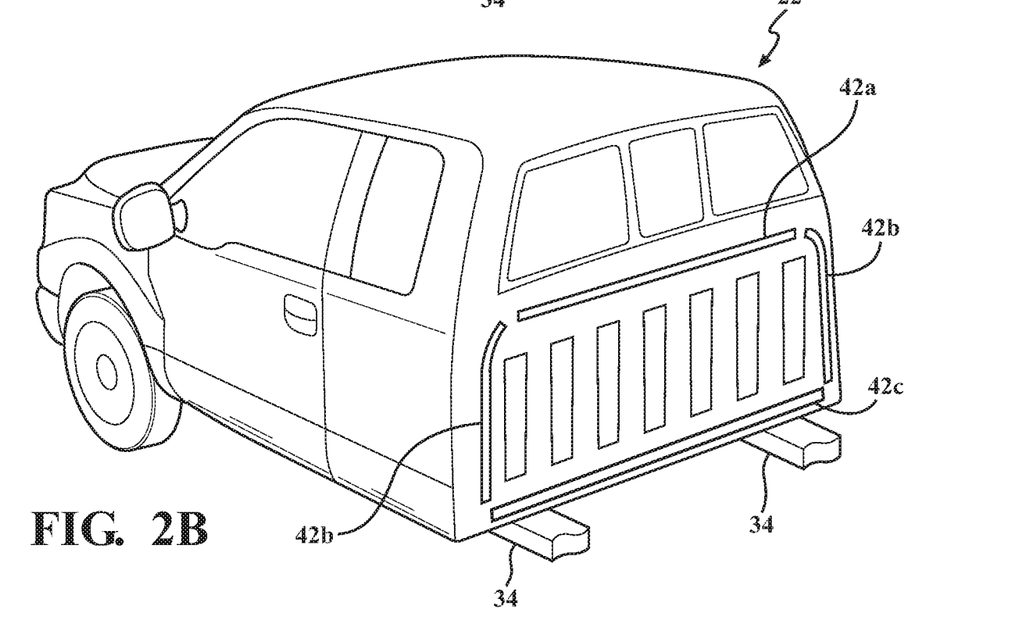
FIG. 2B is a side perspective view of the passenger compartment of FIG. 2A illustrated with a plurality of weather strip seals according to various aspects of the present technology.

FIG. 2A is a side perspective view of the passenger compartment 22 of the truck utility vehicle 20 of FIG. 1. The rear portion 36 of the passenger compartment 22 may define a rear face or wall 38, which may be substantially planar, or have a plurality of shaped features 40 for increased rigidity or strength. The wall 38 may also include holes or apertures (not shown) that are configured for ventilation purposes. FIG. 2B is a side perspective view of the passenger compartment 22 of FIG. 2A, illustrated with a plurality of weather strip seals 42 coupled thereto, according to various aspects of the present technology. As specifically shown, there is one horizontally extending weather strip seal 42a connected to an upper portion of the rear wall 38, below the windows, and one vertically extending weather strip seal 42b connected on each side portion of the rear wall 38. Another weather strip seal 42c may also be provided in a lower area, which may assist in preventing air from moving in an upward direction between the components. Additional weather strip seals may also be provided, as desired. For example, it may be desirable to provide the weather strip seal 42 around a perimeter of a ventilation area (not specifically shown). Also, a plurality of adjacent weather strip seals 42 may be provided where it may not be feasible to include only one single weather strip seal a gap region.

Figure 3A:
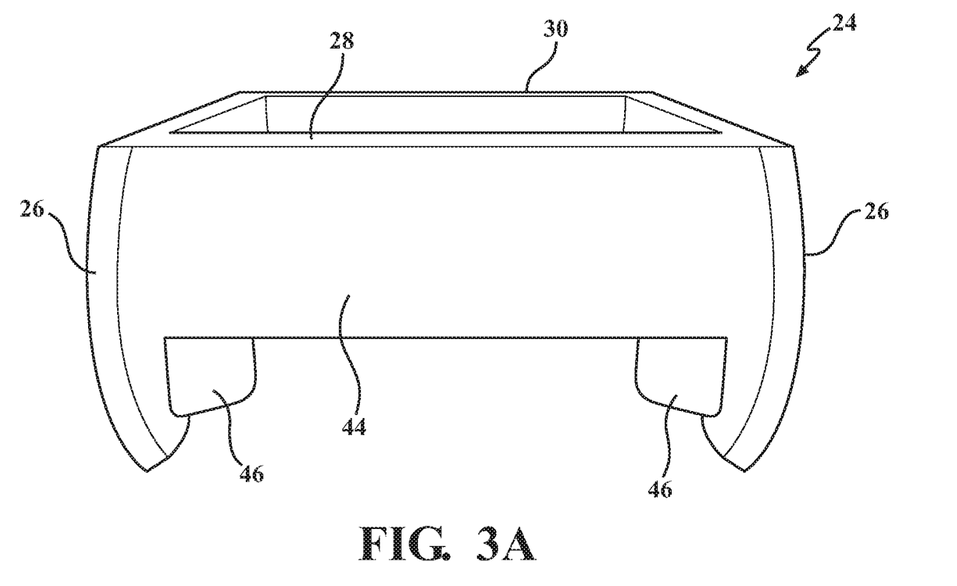
FIG. 3A is a front perspective view of the cargo bed area of the truck utility vehicle of FIG. 1.
Figure 3B:
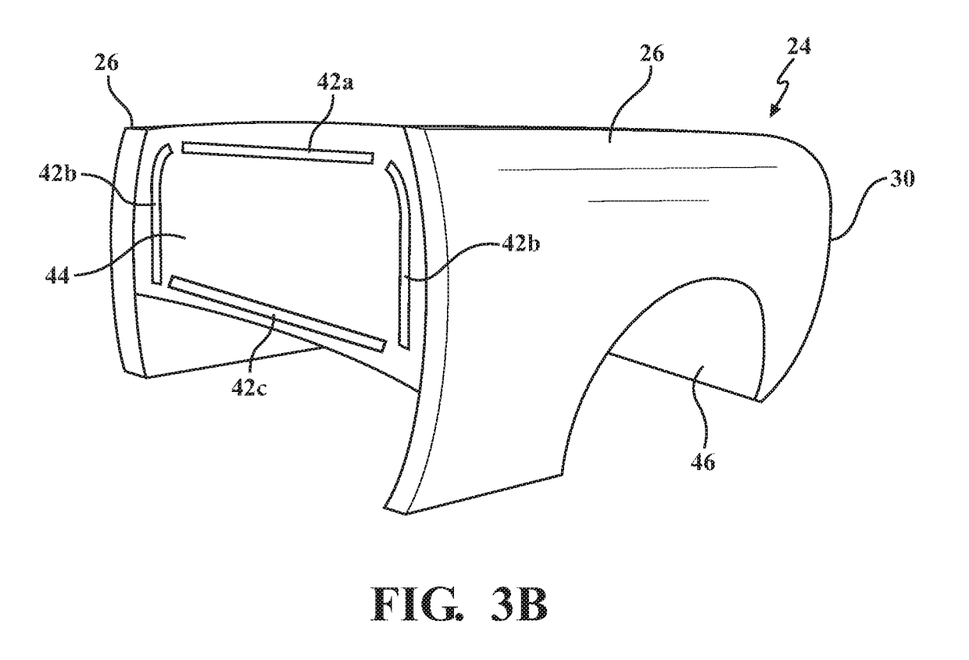
FIG. 3B is a side perspective view of the cargo bed area of FIG. 3A illustrated with a plurality of weather strip seals according to various aspects of the present technology.

In various aspects, as shown in FIG. 2B, the weather strip seals 42 may be connected with a primary/main connection to the passenger cab 22, and with a secondary coupling to the cargo bed 24. In various other aspects the reverse configuration may be desired, where the weather strip seals 42 may be connected with a primary/main connection to the cargo bed 24, and with a secondary coupling to the passenger compartment. As used herein, the primary/main connection is meant to be a permanent type of connection. For example, the connection will remain for the service life of the weather strip seal. This may be accomplished by using any suitable mechanical type fasteners, as shown in FIGS. 5A-5E, or by using other connective means, such as an adhesive, double-sided tape, or the like, as shown in FIG. 5F to connect to the first vehicle component. As used herein, the secondary coupling is meant to be a secure coupling, but may not necessarily be permanent in nature. For example, it may be able to be de-coupled without any damage to the weather strip seal 42 or the vehicle component. In various aspects according to the present technology, the secondary coupling is accomplished using a magnetic sealing mechanism in order to removably couple the weather strip seal to the second vehicle component, FIG. 3A is a front perspective view of the cargo bed 24 of the truck utility vehicle 20 of FIG. 1, and further shows a front face 44 of the front wall 28, as well as tire wells 46. FIG. 3B is a side perspective view of the cargo bed area of FIG. 3A illustrated with a plurality of weather strip seals 42 connected to the front face according to various aspects of the present technology. Although not shown for simplicity, the cargo bed 24 is also coupled to the vehicle frame 34. As specifically shown, there is one horizontally extending weather strip seal 42a connected to an upper portion of the front face 44, one vertically extending weather strip seal 42b connected on each side portion of the front face 44, and another horizontally extending weather strip seal 42c connected to a lower portion of the front face 44. Additional weather strip seals may also be provided, as desired. Also, a plurality of adjacent weather strip seals may be provided where it may not be feasible to include only one single weather strip seal a gap region.

To more fully understand the combinations of FIGS. 2 and 3, either the passenger compartment 22 with the weather strip seals of FIG. 2B is combined with the cargo bed 24 of FIG. 3A (without weather strip seals); or the passenger compartment 22 of FIG. 2A (without weather strip seals) is combined with the cargo bed 24 of FIG. 3B, which has the weather strip seals connected to the front face 44.

Figure 4A:
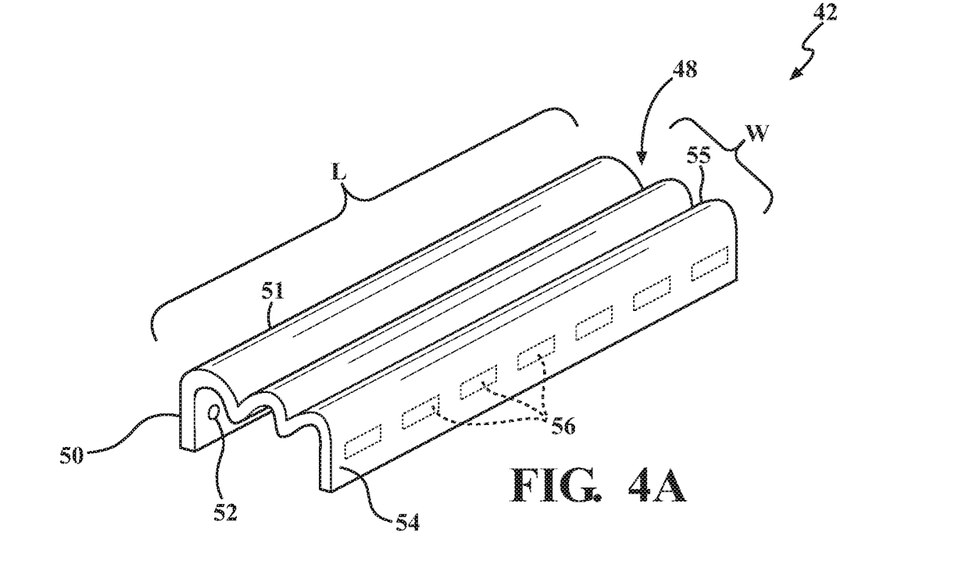
FIG. 4A is a perspective view of an exemplary weather strip seal with a plurality of magnets positioned along an edge of a longitudinally extending coupling end.
Figure 4B:
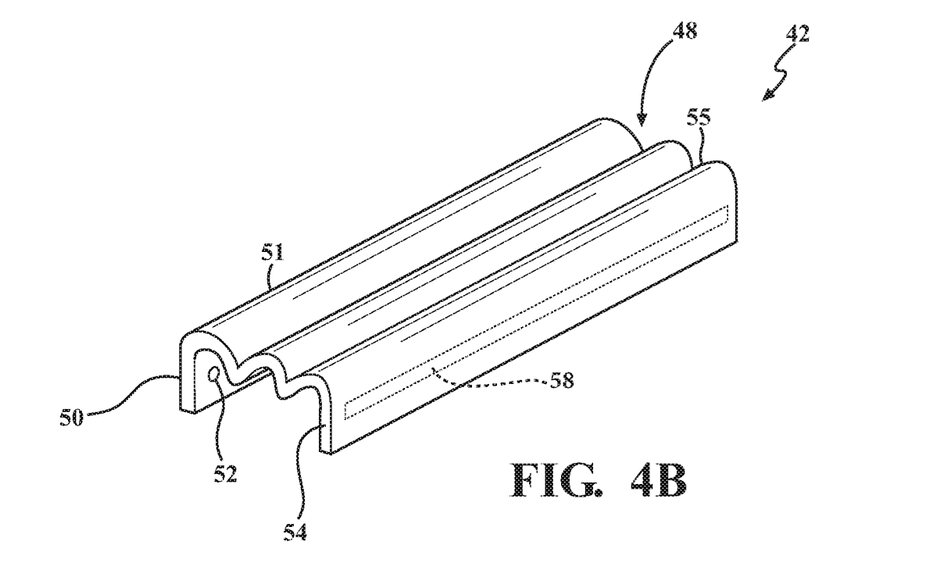
FIG. 4B is a perspective view of an exemplary weather strip seal with a magnetic material positioned along an edge of the longitudinally extending coupling end.

FIGS. 4A and 4B provide additional details of exemplary weather strip seals 42. As previously mentioned, each weather strip seal 42 includes a main body portion 48 that extends a longitudinal distance in a length dimension (L) and has a variable width dimension (W) that may be expanded or retracted depending on a change in width of the gap 32. A connection end 50 is provided, defined by a first longitudinally extending edge 51 of the main body portion 48. The connection end may include one or more apertures 52 for use with mechanical fasteners, or the like, for connecting to the first vehicle component. A coupling end 54, opposite the connection end 50, may be provided, defined by a second longitudinally extending edge 55 of the main body portion 48, for removably coupling to the second vehicle component. The main body portion 48 may be a flexible plastic or rubber material, typical of common weather strip seals. In order to exhibit a variable width, the main body portion 48 may be provided with one or more bends, or accordion-type features, configured to expand and retract/contract as needed. For example, the main body portion may be provided with a "V" or "W" shaped cross-section (see, FIG. 5A). In other aspects, the cross-section may be curved (see, FIG. 5B) or otherwise shaped to provide aerodynamic features while also providing a mechanism to exhibit a variable thickness.

FIG. 4A is a perspective view of an exemplary weather strip seal 42 with a plurality of magnets 56 positioned along the longitudinally extending coupling end 54. In various aspects, the magnets 56 can be spaced apart as desired for strength and intended coupling strength. In certain aspects, a single magnet may be used, extending along all or a portion of the coupling end 54. The magnet(s) 56 may be encapsulated within a portion of the coupling end 54 of the weather strip seal 42, for example, integrally disposed in the weather strip seal 42 during its formation. In other aspects, the magnet(s) 56 may be permanently secured to the weather strip seal 42 using glue, tape, and adhesive, or other fixing mechanisms.

FIG. 4B is a perspective view of an exemplary weather strip seal with a continuous piece of magnetic material 58 positioned along an edge of a longitudinally extending coupling end 54. As used herein, the term "magnetic material" is generally meant to include various metal materials, such as steel, that exhibit an attraction to a magnet. With the design of FIG. 4B, the second vehicle component is provided with one or more magnets 60 (FIGS. 5A, 5B, 5F) configured to locate the magnetic material 58 at an appropriate location against a coupling area, or surface of the second vehicle component. In other aspects, the magnetic material 58 may be provided as a number of separate or distinct pieces, similar to the plurality of spaced apart magnets 56 provided in the weather strip seal 42 of FIG. 4A.

FIGS. 5A-5F provide partial schematic illustrations of various exemplary weather strip seals 42b positioned in a variable width gap 32 between a first vehicle component, the cargo bed 24, and a second vehicle component, the passenger compartment 22. The illustrations provided in FIGS. 5A-5F show the side weather strip seal 42b that is positioned near the circled area 5 as shown in FIG. 1. It should be understood that while the figures specifically provide the front face 44 of the front wall 28 of the cargo bed 24 as being the first vehicle component, for example, the vehicle component with the more permanent connection to receive the connection end 50 of the weather strip seal 42*b*, and the rear wall 38 of the passenger compartment 22 as being the second vehicle component, for example, the vehicle component that receives the coupling end 54 of the weather strip seal—the reverse configuration is equally contemplated.

Figure 5A:
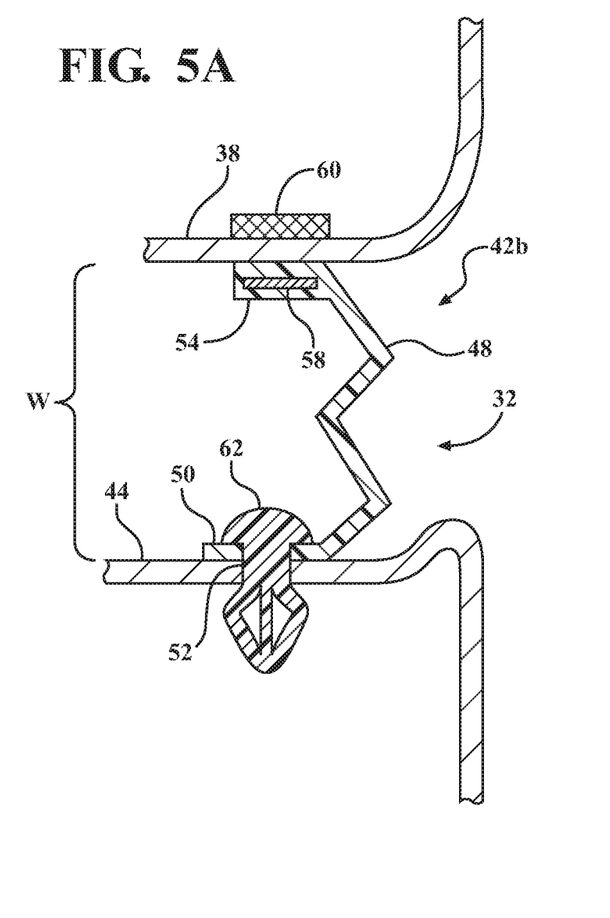
FIG. 5A is a partial schematic illustration of an exemplary weather strip seal system positioned in a variable width gap between a first vehicle component, the passenger cabin, and a second vehicle component, the cargo bed area, according to one aspect of the present technology.

FIG. 5A illustrates the weather strip seal 42*b* disposed in the gap 32 having the connection end 50 secured to the first vehicle component 44 using a suitable mechanical fastener 62, such as a deck bolt connector, and having the coupling end 54 removably secured to a coupling area of the rear wall 38 of the passenger component with a magnetic sealing mechanism. For example, at least one magnet 60 may be strategically located on the rear wall 38 such that it attracts the magnetic material 58 in the coupling end 54 so that the weather strip seal 42*b* is properly aligned. The main body portion 48 is shown as having a substantially "W" shaped cross-sectional area with a plurality of bends, and is configured to expand and retract as necessary when the gap width changes based on the operation of the vehicle 20.

Figure 5B:
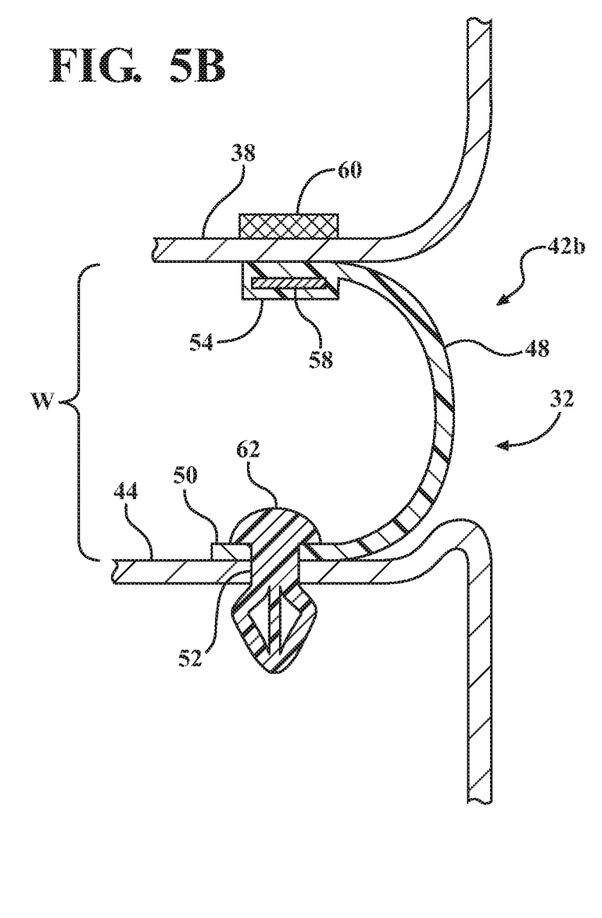
FIG. 5B is a partial schematic illustration of an exemplary weather strip seal according to a second aspect of the present technology.

The aspect shown in FIG. 5B is similar to the aspect shown in FIG. 5A, with the difference being the main body portion 48 is provided with a curved cross-sectional shape, without specific bend regions formed therein. It should be understood that various alternative cross-sectional shapes can also be provided, and can include a combination of the shapes provided in FIGS. 5A and 5B, or even include a bulbous portion, if desired.

Figure 5C:
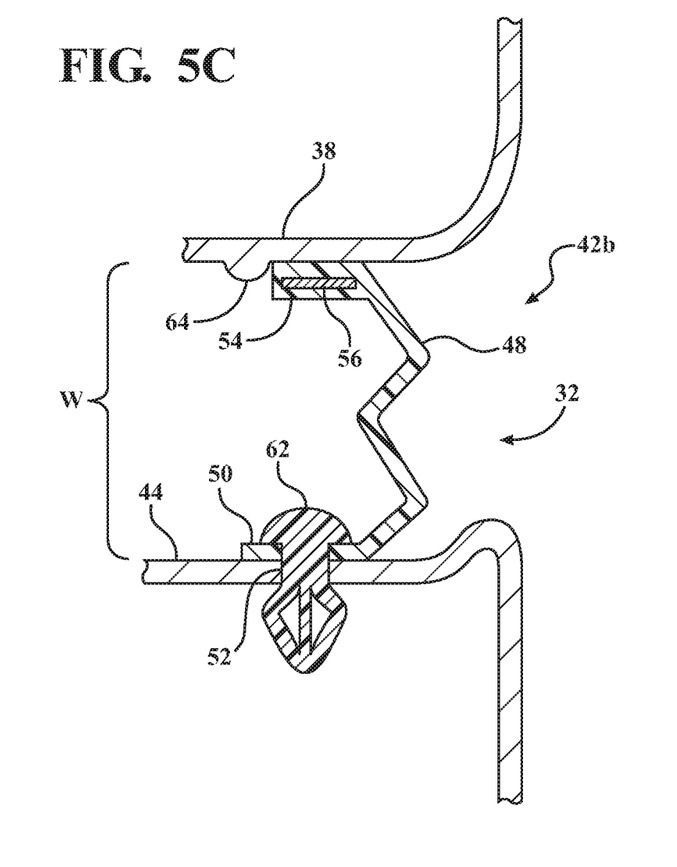
FIG. 5C is a partial schematic illustration of an exemplary weather strip seal according to a third aspect of the present technology.
Figure 5D:
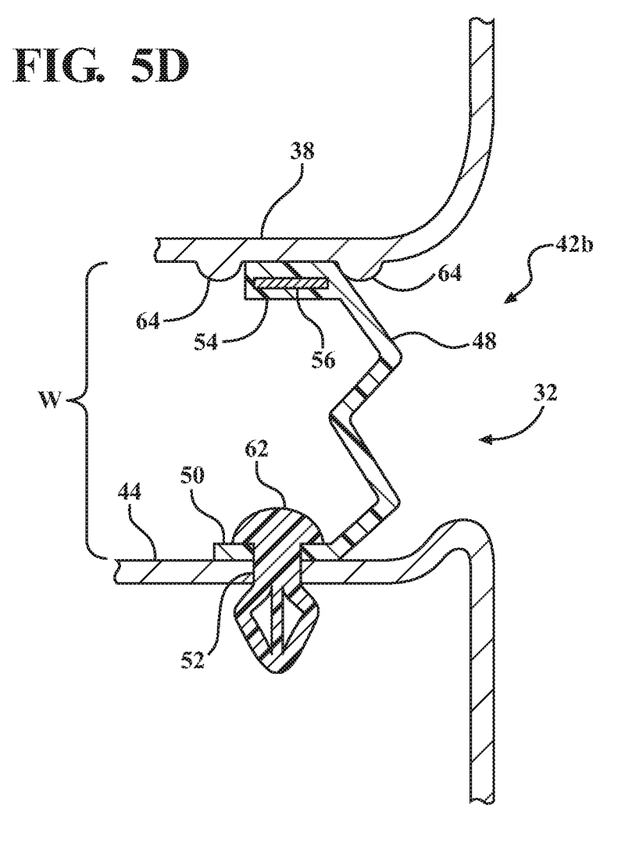
FIG. 5D is a partial schematic illustration of an exemplary weather strip seal according to a fourth aspect of the present technology.
Figure 5E:
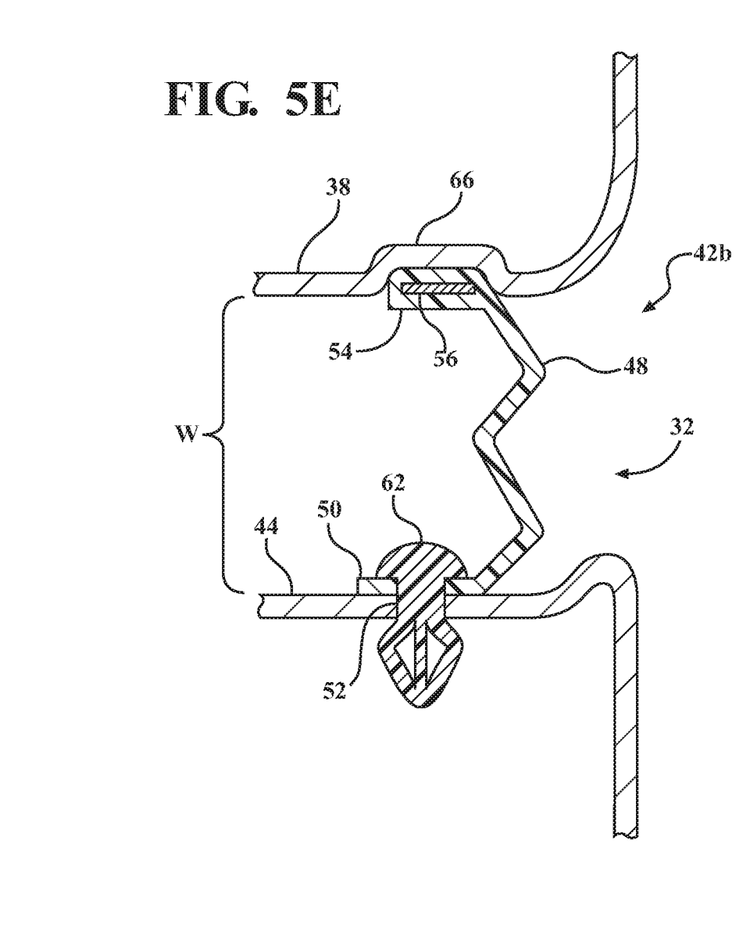
FIG. 5E is a partial schematic illustration of an exemplary weather strip seal according to a fifth aspect of the present technology.
Figure 5F:
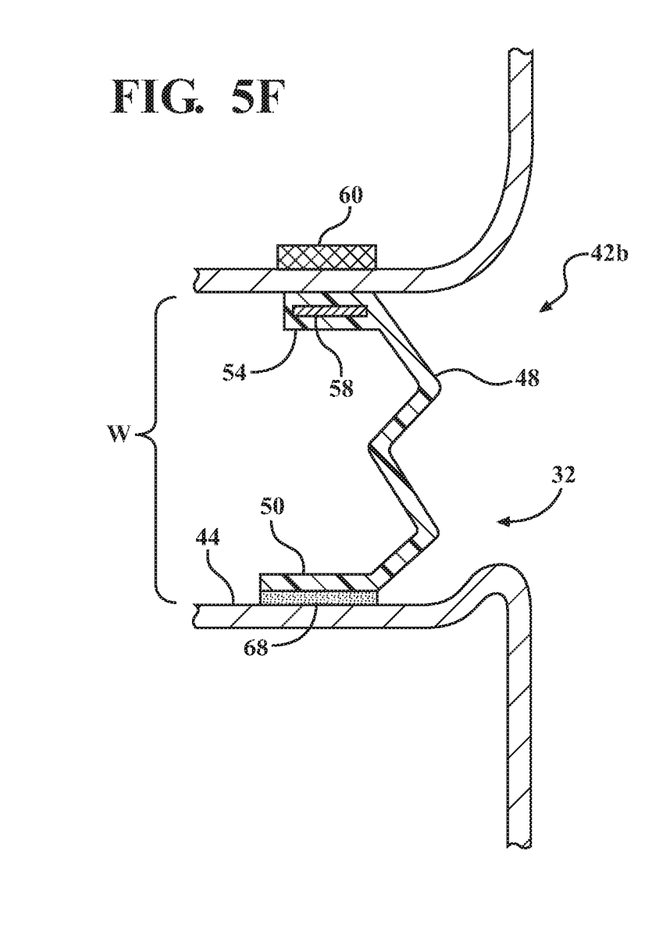
FIG. 5F is a partial schematic illustration of an exemplary weather strip seal according to a sixth aspect of the present technology.

Similar to FIG. 5A, FIG. 5C illustrates the weather strip seal 42*b* disposed in the gap 32 having the connection end 50 secured to the first vehicle component 44 using a suitable mechanical fastener 62, such as a deck bolt connector, and having the coupling end 54 removably secured to a coupling area of the rear wall 38 of the passenger component with a magnetic sealing mechanism. In FIG. 5C, however, the coupling end 54 of the weather strip seal 42*b* includes one or more magnets 56 configured to removably couple the coupling end 54 to the second vehicle component, such as a coupling area of the rear wall 38 of the passenger compartment 22. Since it may be likely that an entire region of the rear wall 38 may serve as a magnetic material for coupling with the magnet, the aspect illustrated in FIG. 5C provides a retention feature 64 defined in the rear wall 38, such as a protrusion, that may be used to align, locate, and maintain a position of the coupling end 54 in an appropriate coupling area. The protrusion 64 may extend a length commensurate with a length of the weather strip seal 42, or may be provided only at certain strategic locations. In other aspects, the retention feature/protrusion 64 can be an independent component, separately secured to the second vehicle component. FIG. 5D provides one aspect where there are multiple protrusions 64 that may be spaced apart and defined to keep the coupling end 54 in a proper alignment that minimizes or prevents and movement of the coupling end 54 with respect to the second vehicle component. FIG. 5E provides yet another aspect, where the retention feature is a recess 66 defined in the coupling area of the second vehicle component. Lastly, FIG. 5F provides an aspect similar to FIG. 5A, however, instead of a mechanical fastener 62, an adhesive 68 or double sided tape may be provided as a suitable fastening technique for connecting the connection end 50 to the first vehicle component.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A weather strip seal system for sealing a gap between two components of a vehicle, the weather strip seal system comprising:
   a first vehicle component;
   a second vehicle component separated from the first vehicle component by a gap, the second vehicle component defining at least one retention feature shaped as a recess or a protrusion; and a weather strip seal disposed in the gap, the weather strip seal comprising:

a main body portion defining a length dimension and a width dimension, at least a portion of the main body portion being expandable and retractable in the width dimension;

a connection end defined by a first longitudinally extending edge of the main body portion, the connection end connecting the weather strip seal to the first vehicle component;

a coupling end, opposite the connection end, defined by a second longitudinally extending edge of the main body portion, the coupling end removably coupling the weather strip seal to the second vehicle component; and a magnet located at the coupling end of the weather strip seal and aligned with the at least one retention feature and removably secured to a magnetic metal located at the second vehicle component, wherein the coupling end is disposed within the recess.

2. The weather strip seal system according to claim 1, comprising a plurality of spaced apart magnets encapsulated within a portion of the coupling end.

3. The weather strip seal system according to claim 1, wherein the main body portion comprises a plurality of bends configured to expand and contract.

4. The weather strip seal system according to claim 1, wherein the main body portion defines a curved section configured to expand and contract in the width dimension.

5. The weather strip seal system according to claim 1, further comprising a mechanical fastener received in an aperture defined in the first vehicle component for coupling the connection end to the first vehicle component.

6. A vehicle, comprising:
a vehicle frame;
a passenger compartment secured to the vehicle frame;
a cargo bed secured to the vehicle frame and separated from the passenger compartment by a gap; and
a weather strip seal system positioned in the gap between the passenger compartment and the cargo bed, the weather strip seal system comprising:
a main body portion defining a length dimension and a width dimension, at least a portion of the main body portion being expandable and retractable in the width dimension; a connection end defined by a first longitudinally extending edge of the main body portion and configured for connecting the weather strip seal to a connection area of one of the passenger compartment and the cargo bed;

a coupling end, opposite the connection end, defined by a second longitudinally extending edge of the main body portion, and comprising a magnetic sealing mechanism configured for removably coupling the weather strip seal to a coupling area of the other one of the passenger compartment and the cargo bed, the coupling area defining at least one retention feature shaped as a recess or a protrusion and aligning the magnetic sealing mechanism in the coupling area, wherein the coupling end is disposed within the recess.

7. The vehicle according to claim 6, wherein the magnetic sealing mechanism comprises a magnet encapsulated in the coupling end of the weather strip seal configured to removably secure itself to a magnetic metal located in the coupling area.

8. The weather strip seal system according to claim 1, further comprising an adhesive material coupling the connection end to the first vehicle component.

9. The weather strip seal system according to claim 1, wherein the second vehicle component comprises one of a passenger compartment and a cargo bed.

10. The weather strip seal system according to claim 1, wherein the at least one retention feature comprises two spaced-apart protrusions defined in the second vehicle component, the protrusions cooperating to retain the coupling end in a proper alignment that minimizes or prevents movement of the coupling end with respect to the second vehicle component.

11. The vehicle according to claim 6, wherein the at least one retention feature comprises two spaced-apart protrusions defined in coupling area, the protrusions cooperating to retain the coupling end in a proper alignment that minimizes or prevents movement of the coupling end with respect to the coupling area.

* * * * *